July 21, 1942.                G. WINTRITZ                2,290,263
SLIDE FASTENER ELEMENT AND METHOD OF MAKING SLIDE FASTENERS
              Filed Dec. 15, 1939          3 Sheets-Sheet 1
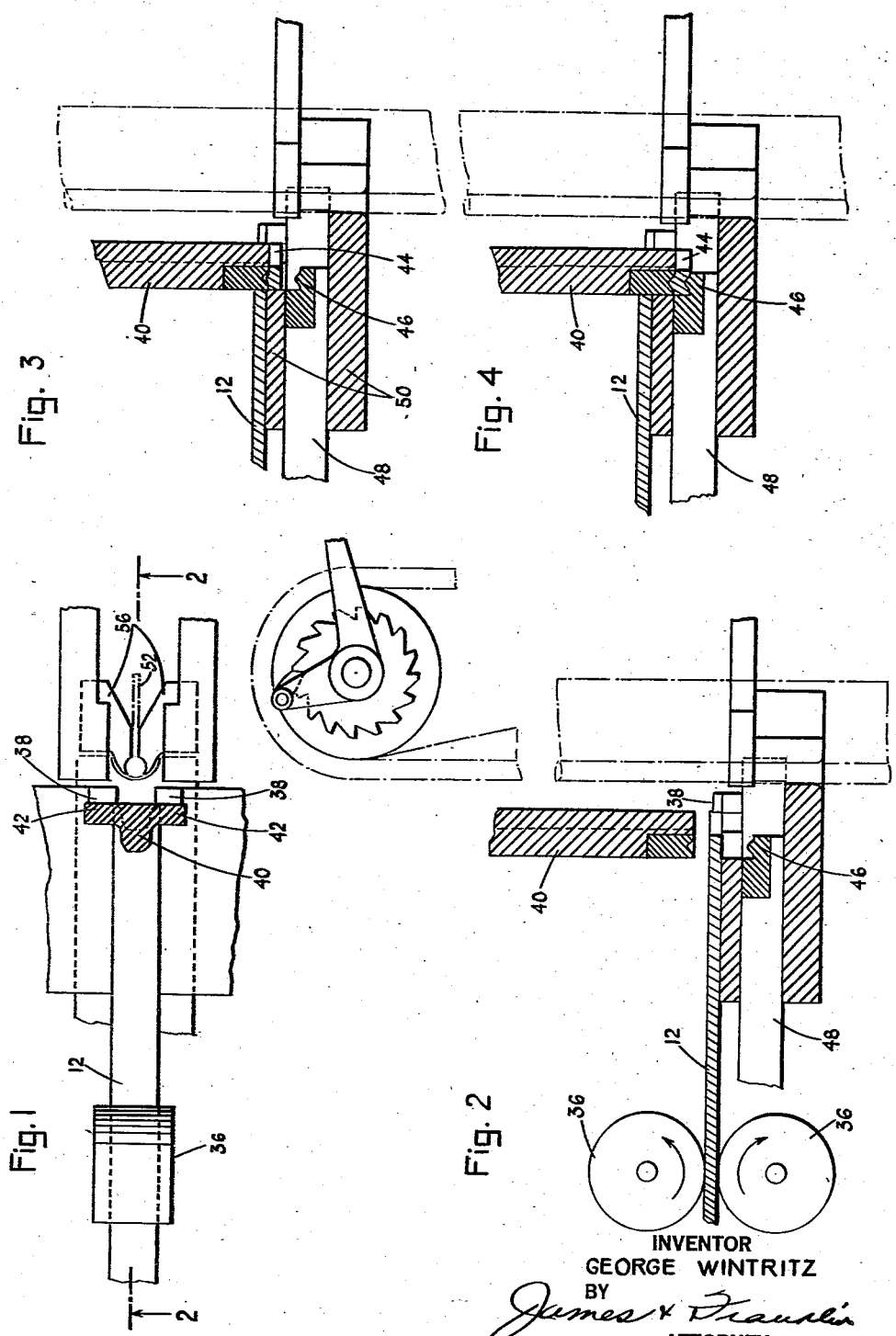
INVENTOR
GEORGE WINTRITZ
BY
James X Franklin
ATTORNEY July 21, 1942.  G. WINTRITZ  2,290,263
SLIDE FASTENER ELEMENT AND METHOD OF MAKING SLIDE FASTENERS
Filed Dec. 15, 1939  3 Sheets-Sheet 2
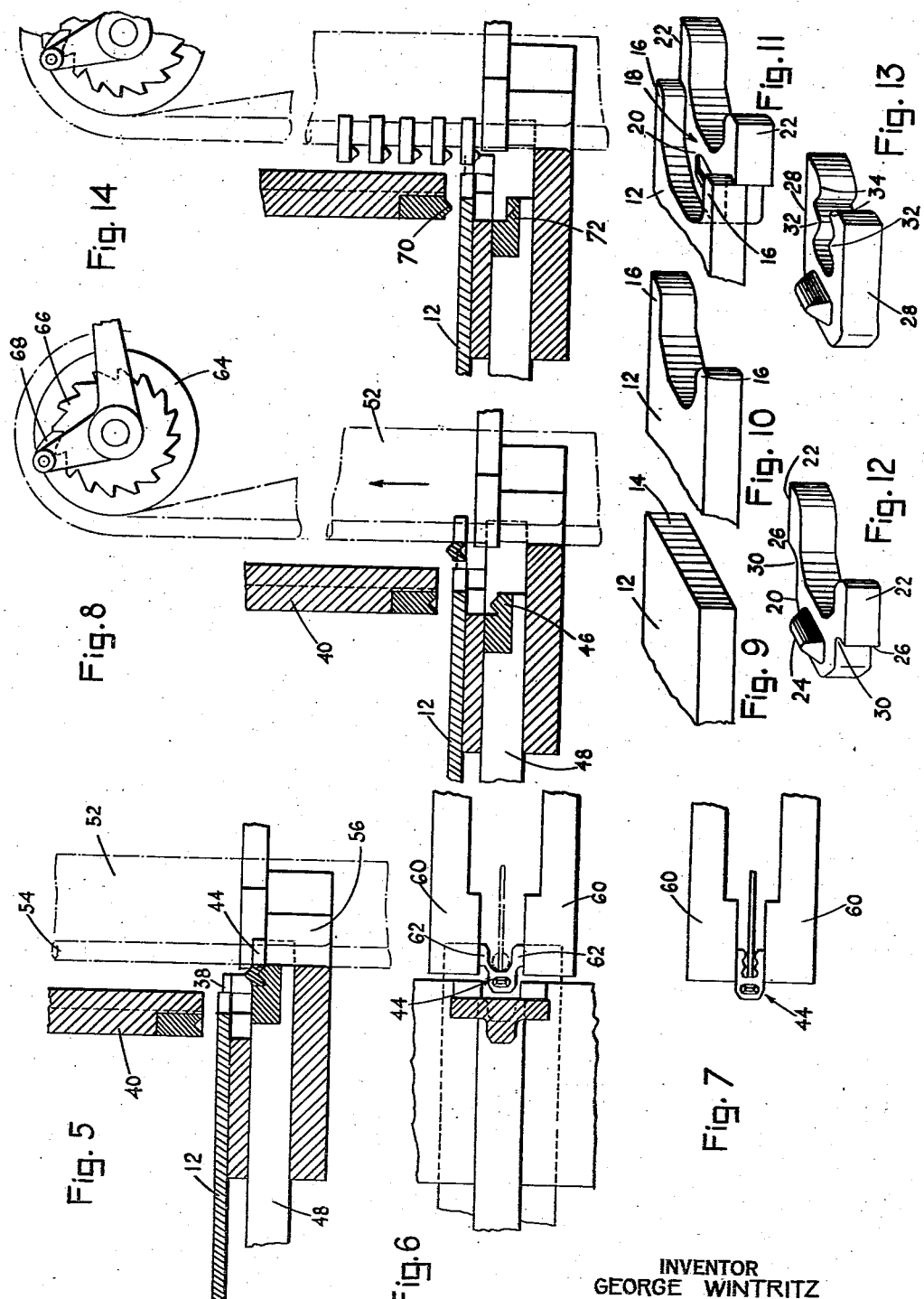
INVENTOR
GEORGE WINTRITZ
ATTORNEY July 21, 1942. G. WINTRITZ 2,290,263
SLIDE FASTENER ELEMENT AND METHOD OF MAKING SLIDE FASTENERS
Filed Dec. 15, 1939 3 Sheets-Sheet 3

INVENTOR
GEORGE WINTRITZ
BY
ATTORNEY

Patented July 21, 1942

2,290,263

UNITED STATES PATENT OFFICE 2,290,263

SLIDE FASTENER ELEMENT AND METHOD OF MAKING SLIDE FASTENERS

George Wintritz, Staten Island, N. Y., assignor to Conmar Products Corporation, Bayonne, N. J., a corporation of New Jersey Application December 15, 1939, Serial No. 309,375

10 Claims. (Cl. 153—1)

This invention relates to an improved fastener element and to an improved method of making slide fasteners.

The primary object of my invention is to generally improve the manufacture of slide fasteners. A more particular object is to eliminate the production of scrap or waste when making slide fastener elements.

In cutting slide fastener elements successively from a strip, the production of scrap or waste may be minimized by so dimensioning the space between the jaws of each element as to receive the head of the next element. Nevertheless, there still remains a difficulty in that, if the finished closed elements are to have parallel sides, the strip cannot be a simple smooth-edged strip, but instead must have notches or serrations along its side edges, the serrations corresponding to the ends of the spread jaws of the elements. An important object of the present invention is to overcome this difficulty, and to manufacture elements from a smooth edged strip without scrap or waste, said elements when closed having conventional parallel sides.

To the accomplishment of the foregoing, and such other objects as will hereinafter appear, my invention consists in the method steps and their relation one to the other, as hereinafter are more particularly described in the specification and sought to be defined in the claims. The specification is accompanied by drawings, in which:

Fig. 1 is a plan view of schematically shown apparatus for practicing the invention;

Fig. 2 is a vertical section taken longitudinally of the apparatus in the plane of the line 2—2 of Fig. 1;

Fig. 3 is a similar view after blanking, but before coining the element;

Fig. 4 is a similar view after coining the element;

Fig. 5 is a similar view showing the feed of the coined element to the tape;

Fig. 6 is a plan view showing the beginning of the jaw clamping operation;

Fig. 7 illustrates the relation of the parts at the end of the jaw clamping operation;

Fig. 8 is a vertical section showing the relation of the parts after the tape with the attached element has been fed upwardly;

Fig. 9 is a perspective view showing the nature of the strip from which the elements are formed;

Fig. 10 is a similar view after one or more elements have been struck from the strip;

Fig. 11 is a similar view showing the blanking of an element from the strip;

Fig. 12 is a perspective view of one of the elements blanked from the strip at the end of the coining operation;

Fig. 13 is a similar view showing the configuration of the element after it has been clamped on the tape;

Fig. 14 is a vertical section through a modified form of apparatus in which the punch and die shapes have been inverted;

Figure 19:
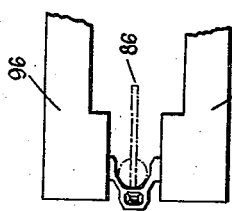
Fig. 19 is a plan view showing the beginning of the clamping operation.

Referring to the drawings, and more particularly to Figs. 9 through 13, the elements are stamped from a strip or wire 12 which is preferably of rectangular section, as is indicated by the end 14. Once the apparatus has been started the end of the wire is no longer straight, as shown in Fig. 9, but is bifurcated, as shown in Fig. 10. The ends 16 become the jaws of the next element, while the space therebetween is dimensioned to correspond to the outline of the head of the element. This will be clear from inspection of Fig. 11 in which an element generally designated 18 is shown blanked from the strip 12. The element 18 comprises a head 20 and spaced or spread jaws 22. The blanking of the head 20 from strip 12 leaves the strip with the bifurcated ends 16, which in turn become the jaws of the next element.

In each case it will be noted that the outside walls of the open jaws 22 are the original unchanged parallel side edges of the strip 12.

Either simultaneously with or subsequent to the blanking operation the head 20 of the element is coined to form a projection 24 on one side, as is shown in Fig. 12, and a mating recess on the opposite side of the head. The jaws 22 are then closed by clamping the same forcibly together on the edge of a tape. They are clamped with such force as to not only close the jaws but to also smoothen and eliminate the bump 26 of excess material on the outside of the jaws, so that the finished closed element has parallel side walls of conventional character, as is clearly shown at 28 in Fig. 13. It should be understood that if jaws such as the jaws 22 shown in Fig. 12 were closed in the conventional way, they would simply bend or pivot about the reduced or neck portion 30. The initially parallel walls 22 would then converge and would no longer be parallel. The part 26 would thereupon constitute a bump or irregularity on the outside of the element. However, by performing the clamping operation between substantially parallel clamping plates, and by continuing the clamping action far enough, the irregularity may be eliminated and the outside wall of the jaws may again be brought into parallel condition.

The excess metal is displaced inwardly. Under preferred conditions it is transferred from the outside of the jaw to the inside of the jaw, as is indicated by the inside serration or irregularity 32 in Fig. 13. This is in addition to the usual jaw tips 34. The irregularities on the inside of the jaws are not truly serrations but, for convenience, may be referred to as such. In any event, these irregularities or serrations help provide a strong grip of the elements on the preferably beaded edge of the tape.

Referring now to Figs. 1 and 2, strip 12 may be fed longitudinally by any suitable feed means, here exemplified by a pair of feed wheels 36 which bear frictionally against the strip. With a friction drive the wheels 36 may rotate continuously. The strip is advanced until it reaches a strip stop, here shown as a pair of spaced abutments 38. The end of the strip is then in the field of action of a suitable punch 40 having heels 42.

After partial descent the punch 40 shears the endmost element 44 from the strip 12, as is clearly shown in Fig. 3. The sheared element is moved downwardly toward a coining die 46 carried on a slide 48, the latter being horizontally reciprocable in the main stationary die 50.

At the end of its descent the punch 40 carries the element 44 against coining die 46 and thereby forms the desired projection and recess on the head of the element, all as is clearly shown in Fig. 4.

Referring now to Fig. 5 the punch 40 rises, whereupon strip 12 is frictionally fed forward until it reaches the stops or abutments 38. The slide 48 is moved forward, thereby carrying the element 44 against a tape 52. This tape may be provided with the conventional beaded edge 54, and the element 44 is moved until it is pressed suitably snugly against the edge of the tape. The tape is, of course, supported in an appropriate tape guide such as that shown at 56 in Figs. 1 and 5. The tape guide supports the beaded edge of the tape up to a point immediately below element 44, as is shown in Fig. 5 and, therefore, the tape is adequately supported when the element is moved up to the tape.

The next step is to clamp the element on the tape. Referring to Fig. 6 the clamping plates 60 have moved together far enough to bear against the jaws 62 of element 44. The clamping plates are initially open to a slightly greater spacing, as will be seen in Fig. 1. The plates 60 continue to clamp the jaws together until they finally reach the fully closed position shown in Fig. 7. At this time the side edges of the element are substantially straight and substantially parallel, or, in other words, the appearance of the element from the outside is quite conventional, and it is adapted to cooperate with a slider of conventional character.

The clamping plates 60 then open and the tape 52 is advanced upwardly an amount equal to the spacing or pitch between elements. This is shown in Fig. 8 in which the tape 52 extends about a suitable tape feed drum 64 actuated by a ratchet wheel 66 which is intermittently moved by a suitable pawl 68. At or about the same time the slide 48 is retracted, thus bringing the coining die 46 directly beneath the punch 40. The parts are then ready to repeat the cycle, which consists of blanking, coining, transferring, and attaching the fastener element.

Fig. 14 is a view similar to Fig. 8 but illustrates a modification in which the male and female parts of the coining die are inverted. Specifically, the projection or male coining part 70 is a part of the punch, while the female coining die 72 is mounted on the slide. The only difference in the finished product is that the elements are secured to the tape with the recess uppermost and the projection pointing downwardly, instead of vice versa. Of these two arrangements, I consider that shown in Figs. 1 through 8 slightly preferable to that shown in Fig. 14 because there is no interference with the blanking or shearing action of the punch. In other words, the cutting edge of the punch which defines and shears the outline of the element first reaches the material or strip.

Still another form of the invention is illustrated in Figs. 15 through 21. In this form of the invention the projection and recess are coined without direct die support, and there is no need for a transfer slide. The strip of material 80 is fed forward by suitable means, such as continuously rotating frictional feed wheels 82. The strip 80 is stopped when its ends reach stop blocks or abutments 84. These are disposed on each side of the tape 86, the latter being guided in a suitable tape guide which, in the present case, is made up of the blocks 84 last referred to. The punch 88 is provided with heels 90 and is channeled or cut away on one face to receive the beaded edge 92 of the tape.

Figure 15:
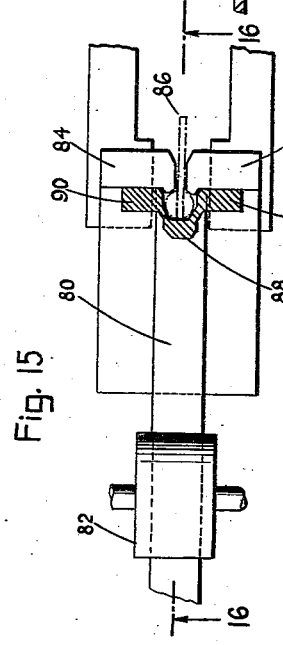
Fig. 15 is a plan view of schematically shown apparatus for practicing the generic invention in a different specific form.
Figure 16:
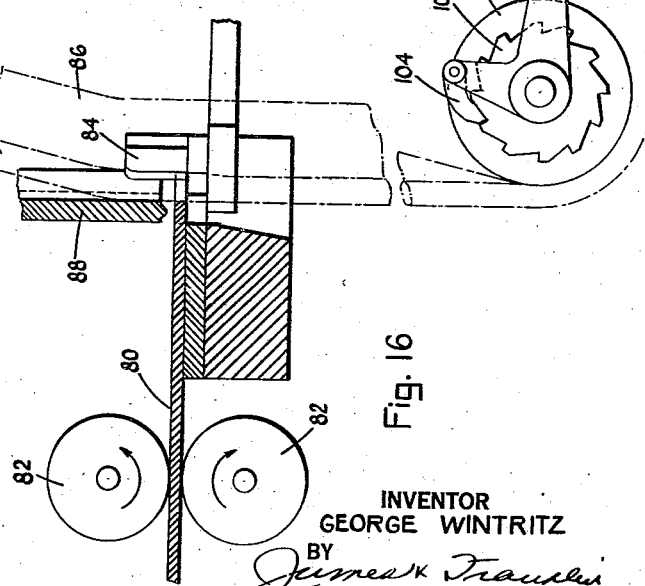
Fig. 16 is a vertical section taken longitudinally through said apparatus approximately in the plane of the line 16—16 of Fig. 15.

The parts are initially in the position shown in Figs. 15 and 16. After partial descent of the punch 88 the recess is formed on the upper side of the strip 80, and a projection is formed on the lower side by reason of the downward displacement of material at the recess. Continued descent of the punch 88 shears an element 94 from the strip 80, as is clearly shown in Fig. 18. This brings the element into the field of action of the clamping plates 96. The element 94 does not fall out of the die, it being held by its frictional engagement with the die and with the beaded edge of the tape 86. It will be noted that the die is cut away or downwardly divergent at 98, but this begins at a point below the clamping position of element 94.

Figure 20:
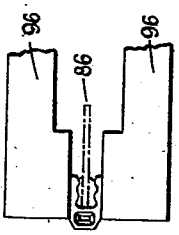
Fig. 20 is a similar view showing the end of the clamping operation.
Figure 21:
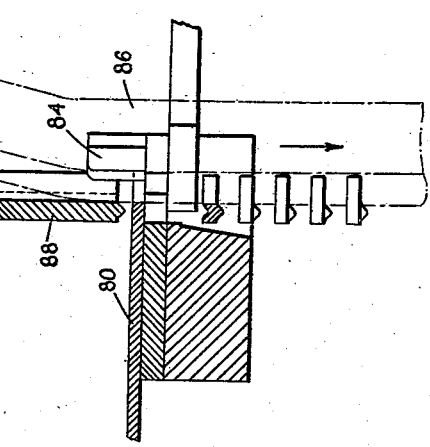
Fig. 21 is a vertical section showing the relation of the parts after downward feed of the tape.
Figure 17:
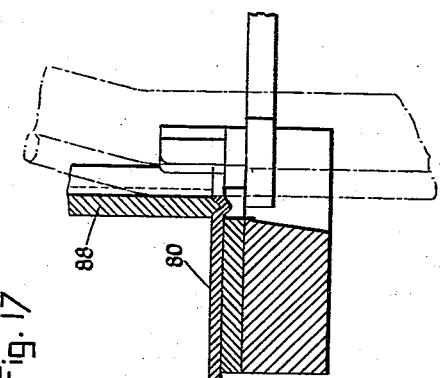
Fig. 17 is a similar section after partial descent of the punch.
Figure 18:
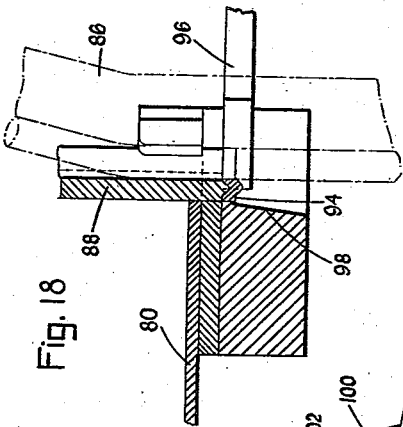
Fig. 18 is a similar section after full descent of the punch.

The punch then rises and the clamping plates 96 come together to close the jaws of the element 94. The initial closing action of plates 96 is shown in Fig. 19, while their final position is shown in Fig. 20. The clamping plates then open and the tape 86 is fed downwardly an amount equal to the spacing or pitch between elements, this being shown in Fig. 21. The mechanism for moving the tape is schematically illustrated in Fig. 16, it comprising a tape feed drum 100 turned by ratchet wheel 102 under drive of a feed pawl 104. In the meantime the upward movement of punch 88 (Fig. 21) has cleared the way for advance of strip 80 against the stop blocks 84 under the drive of the friction feed rollers. The parts are then in position to repeat the above described cycle of operations, that is, the coining, blanking and attaching of the element.

In the present arrangement, as in the previous arrangement, the elements are cut from a smooth edged strip without scrap or waste, the elements having an initial configuration such as that shown in Figs. 12 and 19. Characteristically, the space between the jaws conforms to the shape and dimension of the head, and the outside walls of the open or spread jaws are unchanged portions of the parallel edges of the strip or wire from which the elements are being formed. When the clamping plates 96 come together they not only close the jaws but also deform or displace the material as much as may be necessary to produce a finished element having straight and substantially parallel side edges, as is shown in Fig. 20, even though this may require working the metal enough to displace or transfer some metal to the inside of the jaws.

It is believed that the method of my invention, as well as the advantages thereof, will be apparent from the foregoing detailed description. The method may be practiced in a number of ways, several of which have been described above, and it will therefore be apparent that while I have shown and described my invention in preferred forms, many changes and modifications may be made without departing from the spirit of the invention as sought to be defined in the following claims.

I claim:

1. In the manufacture of slide fastener elements, the method of obtaining conventional parallel-sided elements from open-jawed elements having a bump of excess material on the outside of the jaws at a point intermediate the head of the element and the end of the jaw, which includes clamping the jaws of the element on a tape by smooth straight clamping means with such force as to close the jaws and to displace the bump of material from the outside toward the inside, thereby producing a bump on the inside, the resulting inside serrations or irregularities operating to grip the tape.

2. In the manufacture of slide fastener elements, the method which includes blanking open-jawed elements from a smooth-edged strip without scrap or waste, the head of one element being formed from the material cut away between the jaws of the next element, the jaws of said elements having a bump of excess material on the outside, and thereafter clamping the elements on a tape by smooth straight clamping means with a clamping pressure so great as to not only close the open jaws but to also smoothen and eliminate the bump of material on the outside of the jaws, whereby the completed elements are conventional parallel-sided elements.

3. In the manufacture of slide fastener elements, the method which includes blanking an open-jawed element from a smooth-edged strip without scrap or waste, the head of one element being formed from the material cut away between the jaws of the next element, the jaws of said element having a bump of excess material on the outside, coining a projection and recess on the blanked element, and thereafter clamping the element on a tape by smooth straight clamping means to close the jaws and to smoothen and eliminate the bump of material on the outside of the jaws.

4. In the manufacture of slide fastener elements, the method which includes blanking open-jawed elements from a smooth-edged strip without scrap or waste, the head of one element being formed from the material cut away between the jaws of the next element, the jaws of said elements having a bump of excess material on the outside opposite the recess between the jaws, and thereafter clamping the elements on a tape by smooth straight clamping means with a clamping pressure so great as to close the jaws and to displace the excess material from the outside toward the inside of the jaws, whereby the completed elements have serrations or multiple irregularities on the insides of the jaws engaging and gripping the edge of the tape.

5. In the manufacture of slide fasteners, the method which includes advancing a smooth-edged strip to the field of action of a punch, blanking a fastener element from said strip, said element having spaced jaws pointed toward the end of the strip and a head pointed in opposite direction, the outside walls of said spaced jaws being the original parallel side edges of the strip, the head being so dimensioned as to fit between and being made up of material struck from the strip to form the jaws of the next succeeding element, whereby the elements are blanked from the strip without waste, coining a projection and recess on said blanked element, clamping the open jaws against the edge of a tape, whereby the outside of the jaws tend to become non-parallel, but continuing the clamping action by smooth straight clamping means to eliminate any irregularity on the outside of the jaws in order to produce a finished element having conventional parallel outside edges.

6. In the manufacture of slide fasteners, the method which includes advancing a smooth-edged strip to the field of action of a punch, blanking a fastener element from said strip, said element having spaced jaws pointed toward the end of the strip and a head pointed in opposite direction, the outside walls of said spaced jaws being the original parallel side edges of the strip, the head being so dimensioned as to fit between and being made up of material struck from the strip to form the jaws of the next succeeding element, whereby the elements are blanked from the strip without waste, clamping the open jaws against the beaded edge of a tape, whereby the outside of the jaws tend to become non-parallel, but continuing the clamping action by smooth straight clamping means to eliminate any irregularity on the outside of the jaws in order to produce a finished element having conventional parallel outside edges.

7. In the manufacture of slide fasteners, the method which includes frictionally advancing the end of a smooth-edged strip to spaced abutments marking the field of action of a punch, blanking a fastener element from said strip, said element having spaced jaws pointed toward the end of the strip and a head pointed in opposite direction, the outside walls of said spaced jaws being the original parallel side edges of the strip, the head being so dimensioned as to fit between and being made up of material struck from the strip to form the jaws of the next succeeding element, whereby the elements are blanked from the strip without waste, the jaws of said elements having a bump of excess material on the outside opposite the recess between the jaws, clamping the open jaws against the beaded edge of a tape, whereby the outside of the jaws tend to become non-parallel, but continuing the clamping action by smooth straight clamping means to eliminate any irregularity on the outside of the jaws in order to produce a finished element having conventional parallel outside edges, the excess metal being transferred inwardly and helping improve the grip of the element on the tape, advancing the tape and the strip, and so on.

8. A slide fastener element comprising a head and spread jaws formed integrally therewith, the space between the spread jaws conforming in shape and dimension to the head, and the outside of said spread jaws being parallel, whereby said elements may be cut from a smooth edge strip of metal without scrap or waste, the head and mating jaw space of the element being longer in the longitudinal direction of the element than the parallel outside edges of the jaws, so that the shoulders or inner ends of the parallel sides of the jaws are disposed opposite the hollow space between the jaws.

9. In the manufacture of a slide fastener comprising parallel-sided elements clamped on a tape, the method of forming and attaching the elements without scrap or waste which includes cutting elements from a smooth edge strip of metal, each of said elements comprising a head and spread jaws, the space between said spread jaws conforming in shape and dimension to the head, the outer sides of the spread jaws being unchanged portions of the side edges of the strip of metal, whereby the elements are formed from the smooth edge strip without scrap or waste, the head and mating jaw space being longer in the longitudinal direction of the element than the parallel outside edges of the jaws, so that the shoulders or inner ends of the parallel sides of the spread jaws come opposite the hollow jaw space, and thereafter clamping the jaws of the element on a tape by smooth straight clamping means with such force as to not only close the jaws but to also smoothen and eliminate the bump of excess material at the shoulders, whereby the clamped elements become conventional parallel-sided elements.

10. In the manufacture of a slide fastener comprising parallel-sided elements clamped on a tape, the method of forming and attaching the elements without scrap or waste which includes cutting elements from a smooth edge strip of metal, each of said elements comprising a head and spread jaws, the space between said spread jaws conforming in shape and dimension to the head, the outer sides of the spread jaws being unchanged portions of the side edges of the strip of metal, whereby the elements are formed from the smooth edge strip without scrap or waste, the head and mating jaw space being longer in the longitudinal direction of the element than the parallel outside edges of the jaws, so that the shoulders or inner ends of the parallel sides of the spread jaws come opposite the hollow jaw space, and thereafter clamping the jaws of the element on a tape by smooth straight clamping means with such force as to not only close the jaws but to also smoothen and eliminate the bump of excess material at the shoulders, whereby the clamped elements become conventional parallel-sided elements, said shoulder material being displaced inwardly and producing a bump on the inside of the jaws, the resulting inside serrations or irregularities operating to grip the tape.

GEORGE WINTRITZ.